F. W. PAWLING.
PACKING GLASS IN MOLDS.
APPLICATION FILED SEPT. 10, 1908.
998,921.  Patented July 25, 1911.
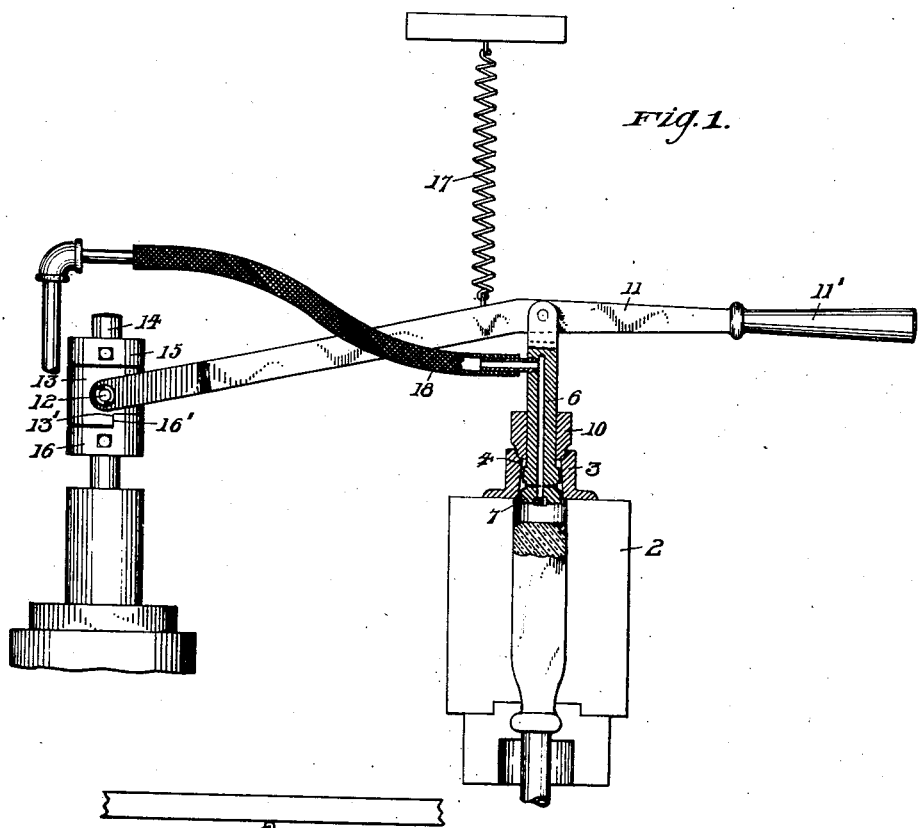
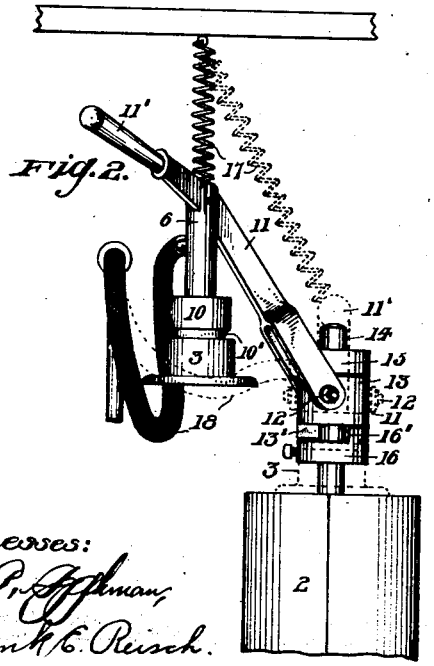
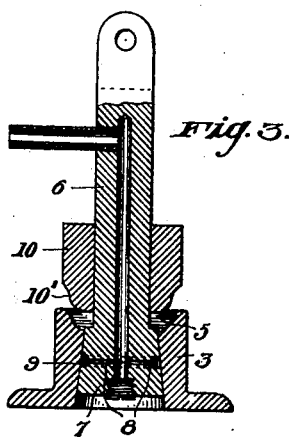

UNITED STATES PATENT OFFICE.

FRANCIS W. PAWLING, OF LOOGOOTEE, INDIANA, ASSIGNOR, BY MESNE ASSIGNMENTS, TO UNITED BOTTLE MACHINERY CO., OF NEW YORK, N. Y., A CORPORATION OF NEW YORK.

PACKING GLASS IN MOLDS.

998,921. Specification of Letters Patent. Patented July 25, 1911.

Application filed September 10, 1908. Serial No. 452,357.

*To all whom it may concern:*

Be it known that I, FRANCIS W. PAWLING, of Loogootee, in the county of Martin and State of Indiana, have invented certain new and useful Improvements in Packing Glass in Molds, of which the following is a specification.

This invention relates to the manufacture of bottles and other molded glassware, and the primary object is to provide improved means for packing or settling the fresh charges of molten glass within the blank or other mold which receives it.

As heretofore practiced, after the proper amount of glass is severed from the gathering iron and dropped into the mold it is crowded or pressed down in the latter either by the shears used to cut it off or by a plunger provided for that purpose. The chilling of the glass resulting from the contact with the shears or plunger impart blemishes, marks or streaks which cannot be removed by the subsequent blowing or other forming operation, with the result that much imperfect ware is produced. The present improvement overcomes these difficulties by providing for the admission of air under such pressure behind the filled in glass as to fully settle and evenly pack the same, no metal being brought in contact with the glass for that purpose.

In the accompanying drawings, Figure 1 is an elevation, partly in section, of one form of apparatus embodying the invention, the air admitting head being shown in position on the mold. Fig. 2 is an elevation taken at right angles to Fig. 1, the head being shown in its normal position away from the mold. Fig. 3 is a vertical section of the air admitting head on a larger scale.

Referring to the drawings, 2 designates a blank mold open at its end to receive the charge of molten glass. As the invention is applicable to blowing, molding or forming machines of various types, it will be understood that the mold and the mechanism coöperating therewith to form or shape the glass comprises no part of the invention. The air admitting device which covers the mold cavity after the glass has been placed therein consists of head 3 having an upwardly tapering bore 4 which at its upper end terminates in the cup-like seat 5.

6 is a tubular air admitting stem having the valve-forming head 7 at its lower end which is tapered upwardly complementary with bore 4, and which is formed with a series of lateral outlet ports 8 which open into groove 9 in the outer face of head 7. Spaced upwardly on stem 6 from head 7 is stop 10, rounded at its lower end at 10' to form an air sealing fit in seat 5. In the present adaptation, stem 6 is shown secured to a handle lever 11, fulcrumed at 12 to collar 13 which turns on a fixed stem or support 14, collar 13 being confined between fixed collars or stops 15 and 16, the latter notched at 16' and collar 13 similarly notched at 13' to limit the swinging movement of the lever for centering head 3 over mold 2. The free portion of lever 11 is suspended on coiled spring 17 which holds the lever and head normally raised from the mold and the spring is hung in such manner as to maintain the suspended parts normally at one side of the mold, as in Fig. 2. Air under pressure may be supplied to stem 6 through flexible tube 18 from any suitable source.

In operation, after the proper quota of molten glass has been deposited in the mold, handle 11' of the lever is grasped by the operator and the lever turned and depressed against the pull of the spring until head 3 is centered over and seated on the mold, and after the head is seated the lever and tubular stem are depressed which lowers valve head 7 and places the rounded lower end 10' of stop 10 in seat 5, all as in Fig. 1. Air is thus freely admitted to the mold cavity under such pressure as to properly settle or pack the glass therein. Head 7 causes the air to enter in a circular or ring-like stream and hence is so spread over the surface of the glass as to cause it to settle evenly and compactly. Upon releasing the lever at the completion of the operation it is raised and moved laterally by the spring, at the same instant drawing valve head 7 upward in head 3 into the position shown in Fig. 3 and shutting off the air.

The advantages of the invention are that the air is so spread over the surface of the glass as to pack the latter uniformly, and as no shears or other iron is thrust into the glass, as in the former practice, no blemishes appear in the finished ware.

I claim:

The combination of a mold having a glass receiving cavity open at the top, a tubular upwardly coned head removably fitting the open top of the mold and inclosing the opening thereof, and a stem coned complementary with and fitting the head and movable vertically therein, the stem having an air passage which opens laterally through its coned surface, whereby when the stem is lowered air is admitted through the space between the coned surfaces.

In testimony whereof I affix my signature in presence of two witnesses.

FRANCIS W. PAWLING.

Witnesses:
JAMES L. McGOVREN,
W. F. O'BRIAN.